United States Patent
Morino et al.

(10) Patent No.: US 11,801,888 B2
(45) Date of Patent: Oct. 31, 2023

(54) VEHICLE RUNNING CONTROL SYSTEM

(71) Applicants: TOYOTA JIDOSHA KABUSHIKI KAISHA, Toyota (JP); PACIFIC INDUSTRIAL CO., LTD., Gifu (JP)

(72) Inventors: Tetsuya Morino, Susono (JP); Yusuke Nakano, Oiso (JP); Rio Suda, Numazu (JP); Yoshio Kudo, Machida (JP); Toshiya Furukura, Susono (JP)

(73) Assignees: TOYOTA JIDOSHA KABUSHIKI KAISHA, Toyota (JP); PACIFIC INDUSTRIAL CO., LTD., Gifu (JP)

( * ) Notice: Subject to any disclaimer, the term of this patent is extended or adjusted under 35 U.S.C. 154(b) by 413 days.

(21) Appl. No.: 16/829,564

(22) Filed: Mar. 25, 2020

(65) Prior Publication Data

US 2020/0307679 A1     Oct. 1, 2020

(30) Foreign Application Priority Data

Mar. 27, 2019   (JP) .................. 2019-059815

(51) Int. Cl.
  *B62D 5/04*    (2006.01)
  *B62D 15/02*   (2006.01)
  *B62D 6/02*    (2006.01)

(52) U.S. Cl.
  CPC ............. *B62D 5/0463* (2013.01); *B62D 6/02* (2013.01); *B62D 15/021* (2013.01)

(58) Field of Classification Search
  CPC ...... B62D 5/0463; B62D 6/02; B62D 15/021; B62D 6/002; B60W 10/20; B60W 30/025; B60W 10/04

USPC ......................................................... 180/446
See application file for complete search history.

(56) References Cited

U.S. PATENT DOCUMENTS

| | | | |
|---|---|---|---|
| 2008/0097666 A1 | 4/2008 | Oba et al. | |
| 2018/0079406 A1* | 3/2018 | Izumi | B62D 15/022 |
| 2018/0170422 A1* | 6/2018 | Yoshida | B62D 5/046 |
| 2020/0307679 A1* | 10/2020 | Morino | B60W 30/025 |

FOREIGN PATENT DOCUMENTS

| | | | | |
|---|---|---|---|---|
| JP | 2004-175230 A | | 6/2004 |
| JP | 2004175230 A | * | 6/2004 |
| JP | 2006-256549 A | | 9/2006 |
| JP | 2006-282141 A | | 10/2006 |
| JP | 2007-8453 A | | 1/2007 |
| JP | 2010-105457 A | | 5/2010 |

* cited by examiner

*Primary Examiner* — Scott A Reinbold
(74) *Attorney, Agent, or Firm* — Sughrue Mion, PLLC

(57) ABSTRACT

A vehicle running control system includes: a steering apparatus that includes a turning device being mechanically separated from a steering wheel; a vehicle drive unit; and a control device. The control device is configured to execute: a turning processing that controls the turning device such that an actual turning angle of the wheel approaches a target turning angle; a vehicle driving processing that determines a target vehicle driving force according to a required vehicle driving force based on a vehicle driving request and that controls the vehicle drive unit so as to cause an actual vehicle driving force to the target vehicle driving force determined; and where a turning angle difference is greater than a turning angle threshold value in a low vehicle speed condition, a driving force limiting processing that limits the target vehicle driving force so as to become smaller than the required vehicle driving force.

3 Claims, 8 Drawing Sheets

VEHICLE RUNNING CONTROL SYSTEM

CROSS-REFERENCE TO RELATED APPLICATION

The present disclosure claims priority under 35 U.S.C. § 119 to Japanese Patent Application No. 2019-59815, filed on Mar. 27, 2019. The content of which is incorporated herein by reference in its entirety.

BACKGROUND

Technical Field

The present disclosure relates to a vehicle running control system, and more particularly to a vehicle running control system including a steering apparatus of a steer-by-wire type.

Background Art

In a steering apparatus of a steer-by-wire type, a turning mechanism that turns vehicle wheels is mechanically separated from a steering wheel. Because of this, unlike a general electric power steering (EPS) device that assists the turning of the vehicle wheels by a driver, a turning motor included in the turning mechanism is required to generate all of the torque necessary for the turning. More specifically, when, for example, the steering wheel is rotated to turn the vehicle wheels during stop of the vehicle (i.e., when stationary steering is performed), turning shaft force required to turn the wheels becomes greater than that during running of the vehicle.

JP 2010-105457 A discloses a steering apparatus for a vehicle of a steer-by-wire type. This steering apparatus includes a drive circuit of a turning motor and a booster circuit arranged at an input portion of the drive circuit. That is to say, the steering apparatus is configured to boost a vehicle-mounted power supply voltage and supply a boosted power supply voltage to the drive circuit of the turning motor. This makes it possible to obtain a desired turning torque by using the booster circuit when a large electric current is required to flow into the turning motor (such as during stationary steering).

SUMMARY

In a vehicle running control system including a steering apparatus of a steer-by-wire type, when the turning axial force required for the turning is great (such as, during stationary steering), the vehicle wheels cannot be turned to a target turning angle due to a shortage of output of the turning motor, and a difference (turning angle difference) of the actual turning angle with respect to the target turning angle may occur. When the vehicle starts to run, the turning shaft force required for the turning decreases. Because of this, the turning angle difference that occurred decreases after the vehicle starts to move.

On the other hand, a change in yaw rate caused by the turning to eliminate the turning angle difference becomes greater when the vehicle speed becomes higher. Therefore, if the vehicle speed increases to a large extent before making the turning angle difference sufficiently small, there is a concern that a sense of discomfort may be given to a passenger due to the occurrence of a large change in yaw rate.

According to the steering apparatus of the steer-by-wire type described in JP 2010-105457 A, as described above, when a large electric current is required to flow into the turning motor, such as during the stationary steering, a desired turning torque can be obtained by using the booster circuit. However, the use of this kind of booster circuit may cause an increase in cost.

The present disclosure has been made in view of the problem described above, and an object of the present disclosure is to make it hard to give a sense of discomfort in a vehicle behavior to a passenger that is caused by elimination of a turning angle difference that occurred during the vehicle stop while reducing an increase in cost, in a vehicle running control system including a steering apparatus of a steer-by-wire type.

A vehicle running control system according to the present disclosure includes: a steering apparatus that includes a tuning device turning a wheel of a vehicle and being mechanically separated from a steering wheel; a vehicle drive unit configured to generate a vehicle driving force; and a control device configured to control the steering apparatus and the vehicle drive unit. The control device is configured to execute: a turning processing that controls the turning device such that an actual turning angle of the wheel approaches a target turning angle; a vehicle driving processing that determines a target vehicle driving force according to a required vehicle driving force based on a vehicle driving request and that controls the vehicle drive unit so as to cause an actual vehicle driving force to the target vehicle driving force determined; and where a turning angle difference being a difference of the actual turning angle with respect to the target turning angle is greater than a turning angle threshold value in a low vehicle speed condition in which a vehicle speed of the vehicle is lower than a vehicle speed threshold value, a driving force limiting processing that limits the target vehicle driving force so as to become smaller than the required vehicle driving force.

The control device may be configured, in the driving force limiting processing, to calculate, as the target vehicle driving force, a value obtained by subtracting a reduction correction amount from the required vehicle driving force. The reduction correction amount may also include a base correction amount being greater when the turning angle difference is greater.

The reduction correction amount may be obtained by multiplying the base correction amount by a first gain coefficient according to the vehicle speed. The first gain coefficient may be greater when the vehicle speed is high than when the vehicle speed is low.

The reduction correction amount may be obtained by multiplying the base correction amount by a second gain coefficient according to a turning speed being a change rate of the actual vehicle turning angle. The second gain coefficient may be greater when the turning speed is high than when the turning speed is low.

The control device may be configured, where, in the low vehicle speed condition, the turning angle difference is greater than the turning angle threshold value and the required vehicle driving force is higher than a driving force threshold value, to execute the driving force limiting processing.

According to the vehicle running control system of the present disclosure, where the turning angle difference is greater than the turning angle threshold value in the low vehicle speed condition, the driving force limiting processing is executed, and, as a result, the target vehicle driving force is limited so as to become smaller than the required vehicle driving force based on a vehicle driving request. This can promote the reduction of the turning angle difference before the vehicle speed becomes too high after the vehicle starts to move (i.e., when the yaw rate is still small). Thus, the vehicle running control system of the present disclosure can make it hard to give a sense of discomfort of the vehicle behavior (e.g., large change in yaw rate) to a passenger, which is caused by elimination of the turning angle difference that occurred during the vehicle stop. Also, this measure using the driving force limiting processing does not require the addition of a booster circuit. Therefore, the vehicle running control system of the present disclosure can make it hard to give the above-mentioned sense of discomfort to a passenger while reducing an increase in cost.

DETAILED DESCRIPTION

Figure 1:
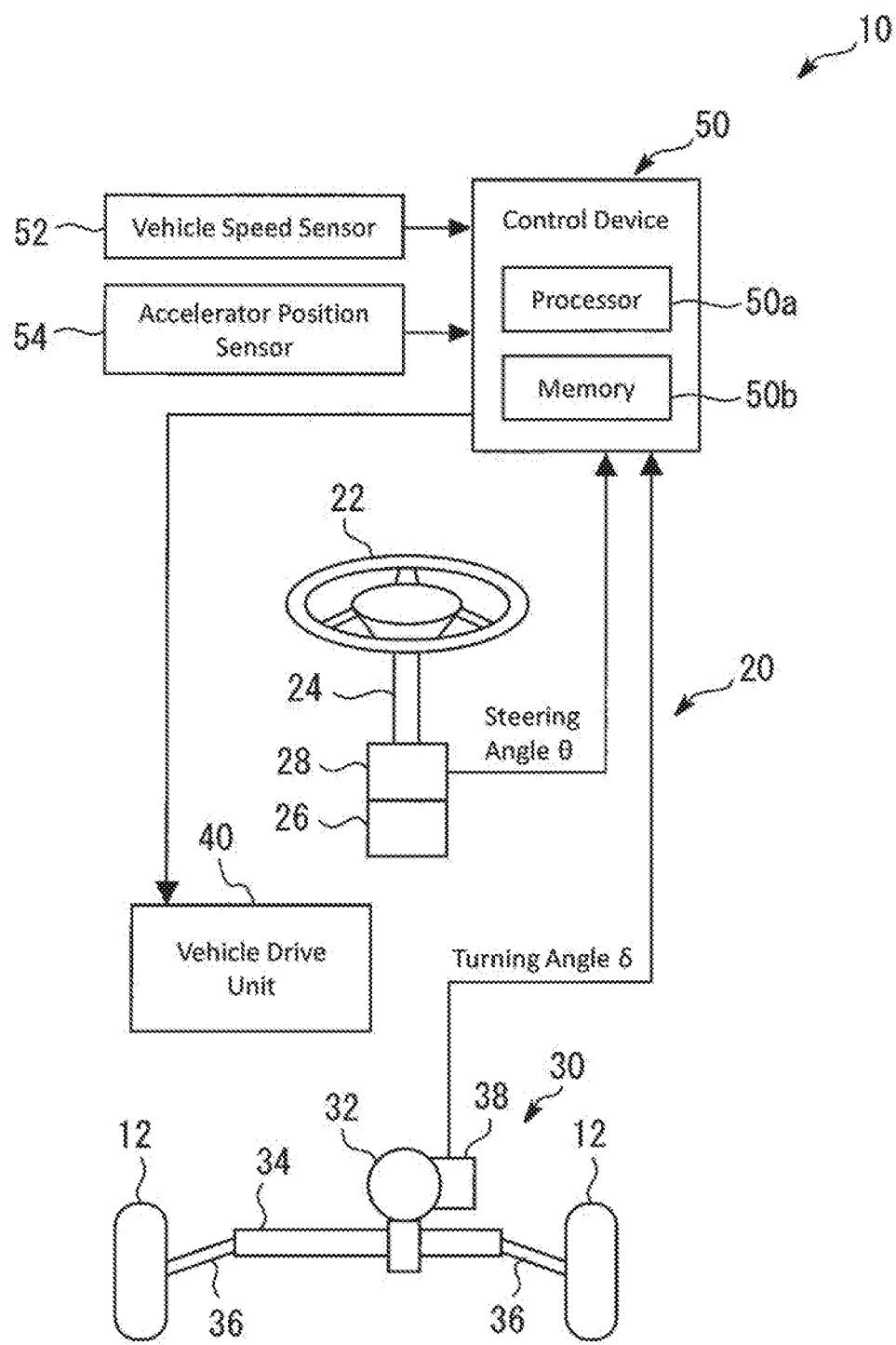
FIG. 1 is a schematic diagram showing a configuration example of a vehicle running control system according to a first embodiment of the present disclosure.

In the following embodiments of the present disclosure, the same components in the drawings are denoted by the same reference numerals, and redundant descriptions thereof are omitted or simplified. Moreover, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiments are not necessarily essential to the present disclosure unless explicitly shown otherwise, or unless the present disclosure is explicitly specified by the structures, steps or the like theoretically.

1. First Embodiment

A vehicle running control system 10 according to a first embodiment of the present disclosure will be described with reference to FIGS. 1 to 7.

1-1. Configuration Example of Vehicle Running Control System

FIG. 1 is a schematic diagram that shows a configuration example of a vehicle running control system 10 according to the first embodiment of the present disclosure. This vehicle running control system 10 includes a steering apparatus 20 mounted on a vehicle. In order to turn wheels (vehicle wheels) 12, the steering apparatus 20 includes a steering wheel 22, a steering shaft 24, a reaction motor 26, a steering angle sensor 28, and a turning device 30. In the example shown in FIG. 1, the two wheels 12 to be steered are front wheels. However, wheels steered by a steering apparatus according to the present disclosure may be rear wheels, instead of or in addition to front wheels.

The steering wheel 22 is a steering member to which a steering operation by a driver is input. The steering wheel 22 is connected to the reaction motor 26 via the steering shaft 24. The reaction motor 26 applies, to the steering wheel 22, a reaction force generated in associated with the turning of the wheels 12. The reaction force motor 26 is supplied with an electric power from a power storage device (for example, a battery or a capacitor) which is not shown. The steering angle sensor 28 is attached to the steering shaft 24, and outputs a signal responsive to the rotation angle of the steering wheel 22, that is, the steering angle (actual steering angle) $\theta$.

The turning device 30 is provided with a turning motor 32, a rack shaft (i.e., turning shaft) 34, tie rods 36, and a turning angle sensor 38. The turning motor 32 is attached to the rack shaft 34 via a speed reducer (not shown). Electric power is supplied to the turning motor 32 from the power storage device described above. The rack shaft 34 is mechanically separated from the steering shaft 24 and the reaction motor 26. The wheels 12 are coupled to the rack shaft 34 via the tie rods 36.

By rotating the turning motor 32 to linearly move the rack shaft 34 in the axial direction, the turning angle (actual turning angle) $\delta$ of the wheels 12 is changed via the tie rods 36. The turning angle sensor 38 is attached to the turning motor 32. There is always a uniquely determined correlation between the rotation angle of the turning motor 32 and the turning angle $\delta$ of the wheels 12. Because of this, the turning angle sensor 38 outputs a signal responsive to the turning angle $\delta$ of the wheels 12.

As described above, according to the steering apparatus 20, the turning device 30 to turn the wheels 12 is mechanically separated from the steering wheel 22. Therefore, the turning of the wheels 12 is performed by this kind of steer-by-wire system using the turning motor 32.

The vehicle running control system 10 includes a vehicle drive unit 40. The vehicle drive unit 40 generates a vehicle driving force F. An example of the vehicle drive unit 40 is an internal combustion engine. As another example of the vehicle drive unit, an electric motor may be used instead of or in addition to the internal combustion engine.

The vehicle running control system 10 further includes a control device 50 configured to control the steering apparatus 20 and the vehicle drive unit 40. The control device 50 includes an electronic control unit (ECU) including at least one processor 50a and at least one memory 50b. The memory 50b stores various data including maps used for vehicle running control (turning control and vehicle driving force control) and various control programs. The processor 50a reads out and executes the control programs from the memory 50b, and the processing by the control device 50 is thereby realized.

Various sensors to measure physical quantities related to the turning control and the vehicle driving force control are connected to the control device 50 directly or via a communication network built in the vehicle. This kind of sensors include at least a vehicle speed sensor 52 and an accelerator position sensor 54 as well as the steering angle sensor 28 and the turning angle sensor 38 described above. The vehicle speed sensor 52 outputs a signal responsive to the vehicle speed V, which is the speed of the vehicle. The accelerator position sensor 54 outputs a signal responsive to the amount of depression of the accelerator pedal of the vehicle (i.e., accelerator position).

The operations of the reaction motor 26, the turning motor 32 and the vehicle drive unit 40 described above are controlled by the control device 50. It should be noted that the control device 50 may be configured using a plurality of ECUs.

1-2. Operation of Vehicle Running Control System

The processing for the vehicle running control (turning control and vehicle driving force control) by the control device 50 includes a "turning processing" and a "vehicle driving processing" which are basic processing associated with the turning control and the vehicle driving force control, respectively. In addition, the processing by the control device 50 according to the present embodiment includes "driving force limiting processing" in order to address an issue on the turning control, which will be described below.

1-2-1. Turning Processing and Vehicle Driving Processing

In the turning processing, the control device 50 controls the turning device 30 such that the actual turning angle $\delta$ of the wheels 12 approaches a target turning angle $\delta t$. The control device 50 calculates the target turning angle $\delta t$ on the basis of for example, the steering angle $\theta$ and the vehicle speed V. In more detail, the control device 50 generates an electric current control signal for driving the turning motor 32 on the basis of the actual turning angle $\delta$ (i.e., the rotation angle of the turning motor 32) and the target turning angle $\delta t$. The turning motor 32 is driven in accordance with the electric current control signal, and the wheels 12 are turned by the operation of the turning motor 32.

In the vehicle driving processing, the control device 50 calculates a required vehicle driving force Fr based on a vehicle driving request. An example of this vehicle driving request is made as a result of depression of the accelerator pedal by the driver. The control device 50 stores a map (not shown) that defines, for example, a relationship between the accelerator position and the required vehicle driving force Fr. The required vehicle driving force Fr that depends on the accelerator position (i.e., that is based on the vehicle driving request) is calculated from this kind of map.

It should be noted that, in an example of a vehicle running control system including an automated operation control unit for realizing an automated operation of a vehicle, a drive request of the vehicle issued by the automated operation control unit during the automated operation corresponds to another example of the vehicle driving request described above.

When there is no request to correct the required vehicle driving force Fr calculated as described above, the control device 50 directly determines the calculated required vehicle driving force Fr as the target vehicle driving force Ft. The correction of the target vehicle driving force Ft by the driving force limiting processing described below corresponds to an example of the correction request of the required vehicle driving force Fr mentioned here.

The control device 50 controls the vehicle drive unit 40 so as to cause the actual vehicle driving force F to approach the determined target vehicle driving force Ft. To be more specific, in an example in which an internal combustion engine is used as the vehicle drive unit 40, one or more predetermined actuators (e.g., a throttle valve and a fuel injection valve) are controlled such that an engine torque satisfying the target vehicle driving force Ft is generated.

1-2-2. Issue on Steering Apparatus of Steer-by-Wire Type

Figure 2:
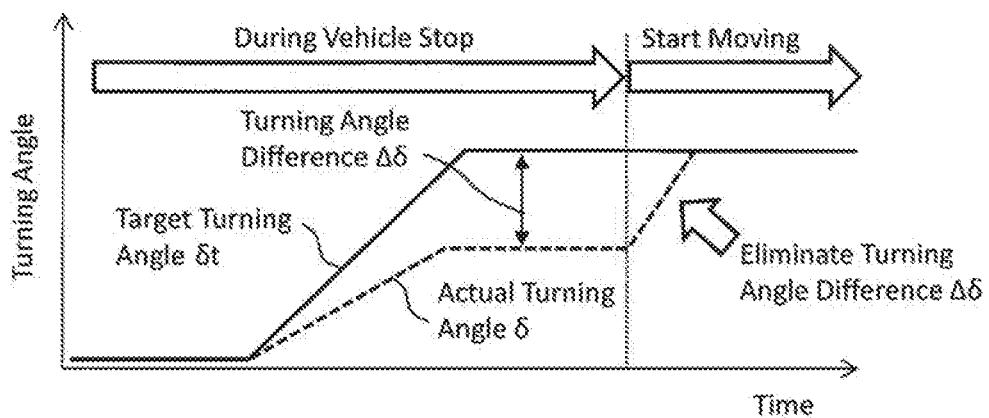
FIG. 2 is a time chart used to explain an issue on a steering apparatus of a steer-by-wire type.
Figure 3:
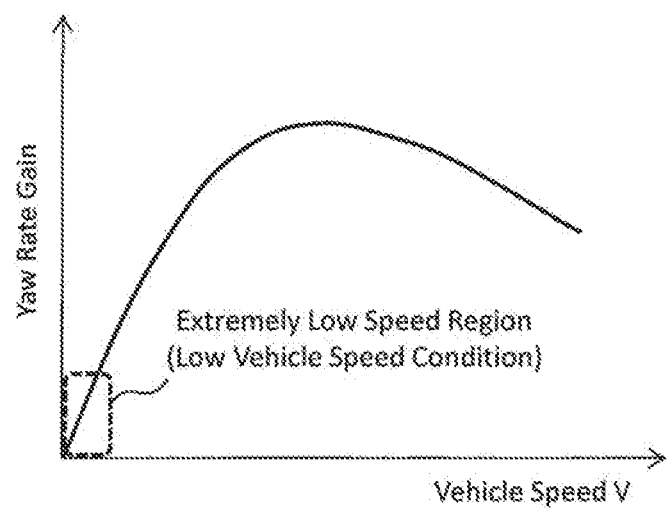
FIG. 3 is a graph showing a relationship between a yaw rate gain and a vehicle speed.

FIG. 2 is a time chart used to explain an issue on a steering apparatus of the steer-by-wire type. FIG. 3 is a graph that shows a relationship between a yaw rate gain (i.e., the magnitude of yaw angular velocity (yaw rate) per unit steering angle) and the vehicle speed V.

In the steering apparatus of the steer-by-wire type, as already described, the turning device to turn the wheels is mechanically separated from the steering wheel. Because of this, unlike a general electric power steering (EPS) device for assisting the turning of the wheels by a driver, the turning motor of the turning device is required to generate all of the torque required for the turning.

When the steering wheel is rotated to turn the wheels during stop of the vehicle (i.e., when stationary steering is performed), turning shaft force required to turn the wheels becomes greater than that during running of the vehicle. As a result, as shown in FIG. 2, when the target turning angle $\delta t$ changes in association with the rotation (steering) of the steering wheel by the driver during the stop of the vehicle, a situation may occur in which the wheels cannot be turned to a target turning angle $\delta t$ due to a shortage of the output of the turning motor. When this kind of situation occurs, a difference (turning angle difference $\Delta \delta$) of the actual turning angle $\delta$ with respect to the target turning angle $\delta t$ occurs.

When the vehicle starts to run, the turning shaft force required for the turning decreases. Because of this, as shown in FIG. 2, the turning angle difference $\Delta \delta$ decreases with a lapse of time. On the other hand, the yaw rate gain changes in accordance with the vehicle speed V. In more detail, as shown in FIG. 3, the yaw rate gain after the vehicle starts to run becomes greater when the vehicle speed V becomes higher, until the yaw rate gain reaches a vehicle speed value (which is a sufficiently high vehicle speed value compared to the following low vehicle speed condition assumed in the present embodiment). That is to say, a change in yaw rate that occurs in association with the turning to eliminate the turning angle difference $\Delta \delta$ becomes greater when the vehicle speed V becomes higher. Therefore, if the vehicle speed V increases to a large extent before making the turning angle difference $\Delta \delta$ sufficiently small, there is a concern that a sense of discomfort in a vehicle behavior may be given to a passenger due to the occurrence of a large change in yaw rate.

1-2-3. Outline of Driving Force Limiting Processing

In view of the issue described above, the processing by the control device 50 according to the present embodiment includes the "driving force limiting processing". This driving force limiting processing is executed together with the turning processing and the vehicle driving processing described above when the turning angle difference $\Delta\delta$ is greater than a turning angle threshold value $\delta$th in a low vehicle speed condition in which the vehicle speed V is lower than a predetermined vehicle speed threshold value Vth. Also, in the driving force limiting processing, the control device 50 limits the target vehicle driving force Ft so as to become smaller than the required vehicle driving force Fr.

To be more specific, when the low vehicle speed condition described above is satisfied immediately after the vehicle starts to move from a stopped state, the control device 50 executes the driving force limiting processing as long as the turning angle difference $\Delta\delta$ is greater than the turning angle threshold value $\delta$th. It should be noted that the driving force limiting processing according to the present embodiment is executed basically in a low vehicle speed condition with the vehicle moving forward. However, this driving force limiting processing can also be applied to a low vehicle speed condition with the vehicle moving backward.

1-2-3. Processing by Control Device

Figure 4:
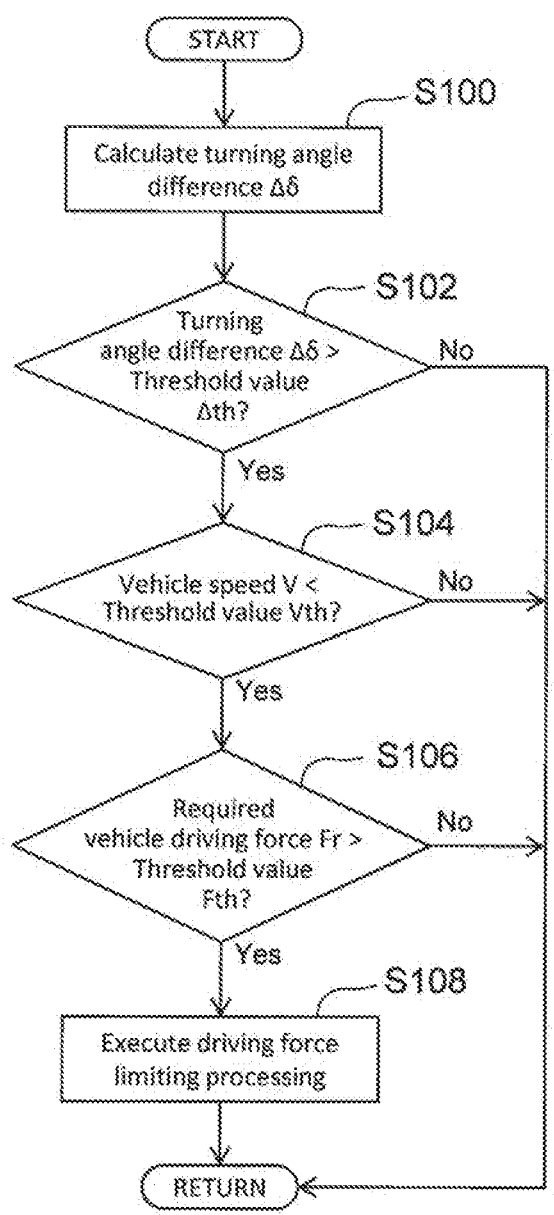
FIG. 4 is a flowchart showing a routine of processing concerning control of the vehicle running control system according to the first embodiment of the present disclosure.

FIG. 4 is a flowchart that shows a routine of processing concerning the control of the vehicle running control system 10 according to the first embodiment of the present disclosure. The processing of this routine is repeatedly executed during running of the vehicle running control system 10.

In the routine shown in FIG. 4, first, in step S100, the control device 50 calculates the turning angle difference $\Delta\delta$ which is a difference of the actual turning angle $\delta$ with respect to the target turning angle $\delta$t. The actual turning angle $\delta$ used for calculating the turning angle difference $\Delta\delta$ is obtained using the turning angle sensor 38, and the target turning angle $\delta$t is calculated by the turning processing described above. Thereafter, the processing proceeds to step S102.

In step S102, the control device 50 determines whether or not the calculated turning angle difference $\Delta\delta$ is greater than a predetermined turning angle threshold value $\delta$th. If, as a result, the determination result is negative ($\Delta\delta \leq \delta$th), the control device 50 ends the current processing cycle without performing the driving force limiting processing.

On the other hand, if the determination result of step S102 is positive ($\Delta\delta > \delta$th), the processing proceeds to step S104. In step S104, the control device 50 determines whether or not the vehicle speed V is lower than a predetermined vehicle speed threshold value Vth, that is, whether or not the "low vehicle speed condition" described above is satisfied.

To be more specific, the vehicle speed threshold value Vth, which is a vehicle speed value of the upper limit of the low vehicle speed condition, is determined as follows. That is to say, the low vehicle speed condition is associated with an extremely low speed region (e.g., 3 km/h or less) in which the vehicle driving force P is limited by the driving force limiting processing. The relationship between the yaw rate gain and the vehicle speed V is as shown in FIG. 3 described above, and the yaw rate gain is sufficiently small in this kind of extremely low speed region. Because of this, if the turning angle difference $\Delta\delta$ is eliminated in this kind of extremely low speed region, it is possible to make a passenger of the vehicle hardly feel a change in yaw rate caused by the elimination of the turning angle difference $\Delta\delta$. Therefore, the vehicle speed threshold value Vth is set to 3 km/h as an example. However, as a specific numerical value of the vehicle speed threshold value Vth, a desired value other than 3 km/h can be used. In addition, from the viewpoint of the magnitude of the allowable yaw rate gain, the vehicle speed threshold value Vth may be set to 10 km/h, for example.

If the determination result of step S104 is negative (V≥Vth), the control device 50 terminates the current processing cycle without performing the driving force limiting processing. If, on the other hand, the determination result of step S104 is positive (V<Vth), the processing proceeds to step S106. In step S106, the control device 50 determines whether or not the required vehicle driving force Fr is greater than a predetermined driving force threshold value Fth. The required vehicle driving force Fr is calculated, for example, as a value depending on the accelerator position.

If the determination result of step S106 is negative (Fr≤Fth), the control device 50 terminates the current processing cycle without performing the driving force limiting processing.

If, on the other hand, the determination result of step S106 is positive (Fr>Fth), the processing proceeds to step S108. In step S108, the control device 50 executes the driving force limiting processing. Specifically, in the driving force limiting processing, the control device 50 corrects (limits) the target vehicle driving force Ft such that, as an example, the target vehicle driving force Ft has a value (constant value) equal to the driving force threshold value Fth.

1-3. Effects

Figure 5:
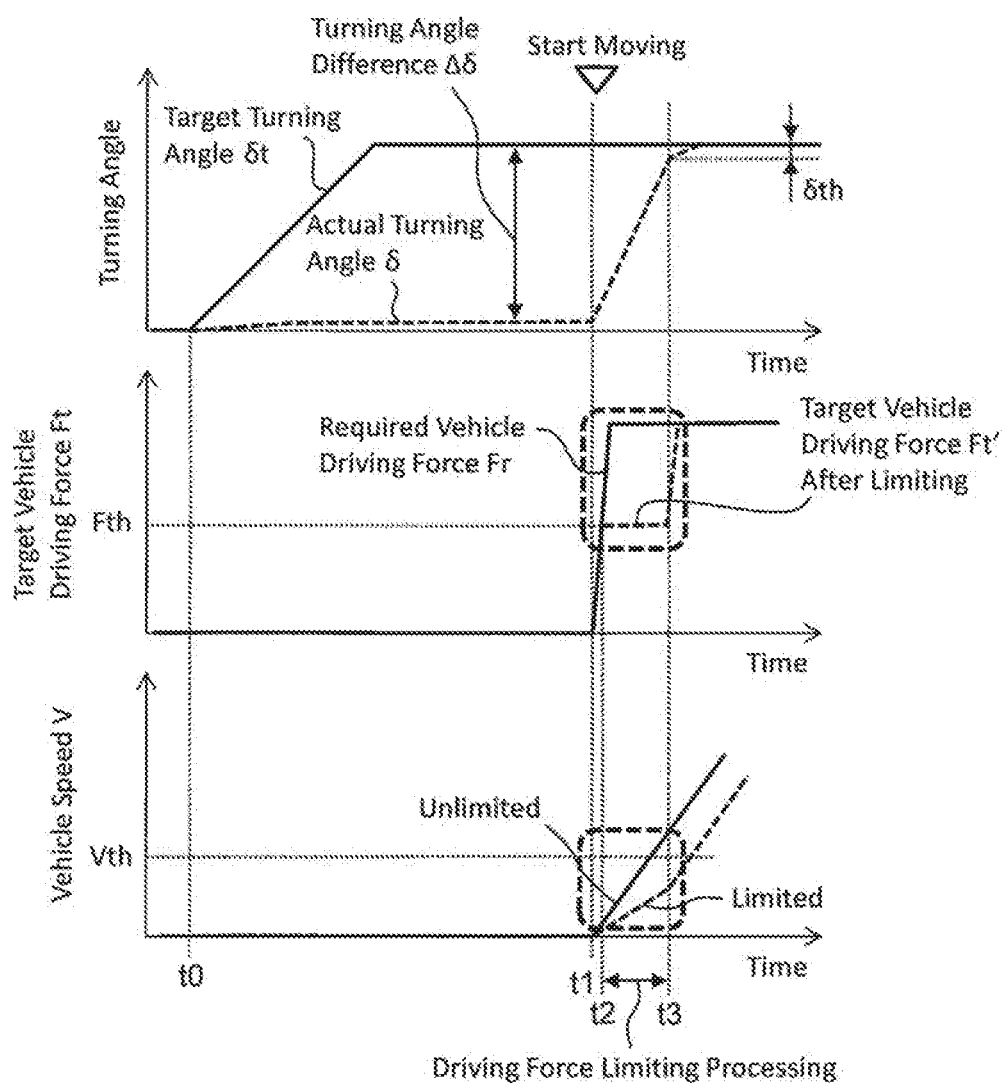
FIG. 5 is a time chart showing an example of the operation of the vehicle as a result of the processing of the routine shown in FIG. 4.

FIG. 5 is a time chart that shows an example of the operation of the vehicle as a result of the processing of the routine shown in FIG. 4. A time point t0 in FIG. 5 corresponds to a time point at which the operation of rotating the steering wheel 22 to turn the wheels 12 (i.e., stationary steering) is started by the driver during stop of the vehicle. As a result, a large turning angle difference $\Delta\delta$ is produced due to an increase in the turning shaft force during the stop of the vehicle.

A time point t1 corresponds to a time point at which the accelerator pedal is depressed by the driver when a turning angle difference $\Delta\delta$ greater than the turning angle threshold value $\delta$th is produced and, as a result, the required vehicle driving force Fr starts to increase. As a result of the depression of the accelerator pedal, the vehicle starts to move.

The subsequent time point t2 corresponds to a time point at which the required vehicle driving force Fr reaches the driving force threshold value Fth in the low vehicle speed condition lower than the vehicle speed threshold value Vth. According to the processing of the routine described above, where, in the low vehicle speed condition, the turning angle difference $\Delta\delta$ is greater than the turning angle threshold value $\delta$th and the required vehicle driving force Fr is greater than the driving force threshold value Fth, the driving force limiting processing described above is executed.

According to the driving force limiting processing, the target vehicle driving force Ft is limited so as to become smaller than the required vehicle driving force Fr (solid line). More specifically, in the example of the driving force limiting processing according to the routine shown in FIG. 4, the target vehicle driving force Ft is limited by a value (broken line) equal to the driving force threshold value Fth, as shown in FIG. 5.

A waveform of the vehicle speed V shown by the solid line in FIG. 5 corresponds to an example in which the driving force limiting processing is not performed, and a waveform of the vehicle speed V shown by the broken line corresponds to an example in which the driving force limiting processing is performed. Since the target vehicle driving force Ft is limited by the driving force limiting processing, the actual vehicle driving force F is limited in accordance with a target vehicle driving force Ft after the limitation. As a result, as shown in FIG. 5, an increase in the vehicle speed V is reduced as compared to the example in which the driving force limiting processing is not performed. Moreover, in a time period in which the increase of the vehicle speed V is limited in this manner, the turning angle difference Δδ decreases since the turning shaft force decreases as a result of the vehicle speed V becoming higher than that during the stop of the vehicle.

A time point t3 corresponds to a time point at which the turning angle difference Δδ has decreased to the turning angle threshold value δth. When this time point t3 is reached, the driving force limiting processing is terminated. As a result, the required vehicle driving force Fr is used as the target vehicle driving force Ft.

As described so far, according to the turning processing associated with the driving force limiting processing according to the present embodiment, where the vehicle starts to move when a greater turning angle difference Δδ than the turning angle threshold value δth is produced, the decrease in the turning angle difference Δδ can be promoted before the vehicle speed V becomes too high (i.e., when the yaw rate is still small). Thus, the turning control according to the present embodiment can make it hard to give a sense of discomfort of the vehicle behavior to a passenger, which is caused by elimination of the turning angle difference Δδ that occurred during stop of the vehicle. Also, this measure using the driving force limiting processing does not require the addition of a booster circuit. Therefore, the vehicle running control system 10 can make it hard to give the above-mentioned sense of discomfort to a passenger while reducing an increase in cost.

According to the processing of the routine shown in FIG. 4, the driving force limiting processing is executed when the determination condition that the required vehicle driving force Fr is greater than the driving force threshold value Fth is satisfied in addition to the turning angle difference Δδ being greater than the turning angle threshold value δth in the low vehicle speed condition. If the required vehicle driving force Fr is great (i.e., if a rapid acceleration of the vehicle is performed), the vehicle speed V tends to increase largely while a large turning angle difference Δδ remains, and, as a result, a large change in yaw rate tends to occur as a result of the turning to eliminate the turning angle difference Δδ. If, on the other hand, the required vehicle driving force Fr is small (i.e., if a moderate acceleration of the vehicle is performed), the turning angle difference Δδ is easily eliminated before the vehicle speed V increases to a large extent. Therefore, according to the example of the routine shown in FIG. 4 including the determination condition regarding the vehicle driving force F in the execution condition of the driving force limiting processing, it becomes possible to execute the driving force limiting processing while appropriately discriminating the situation requiring the limitation of the degree of vehicle speed increase using the driving force limitation.

1-4. Other Examples of Processing by Control Device

Figure 6:
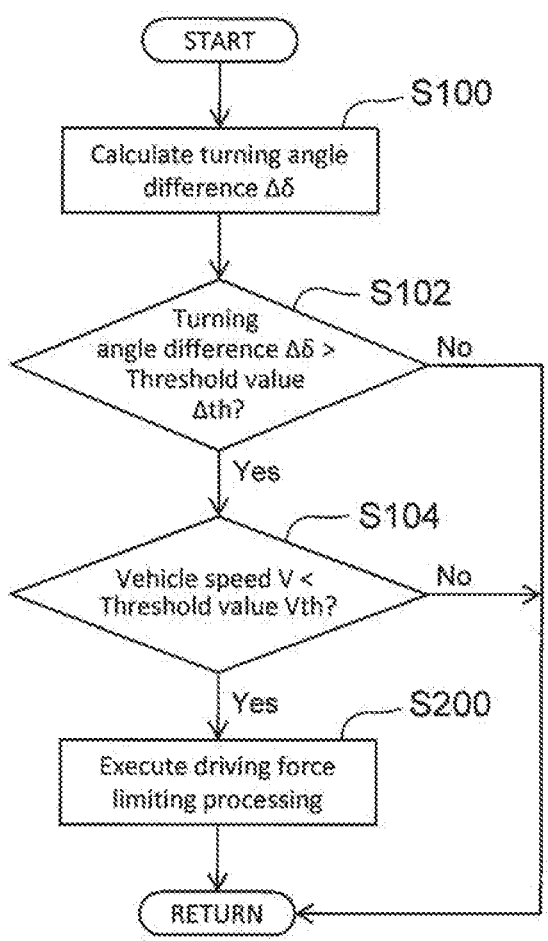
FIG. 6 is a flowchart showing a routine of processing concerning control of the vehicle running control system according to a first modification example of the first embodiment of the present disclosure.
Figure 7:
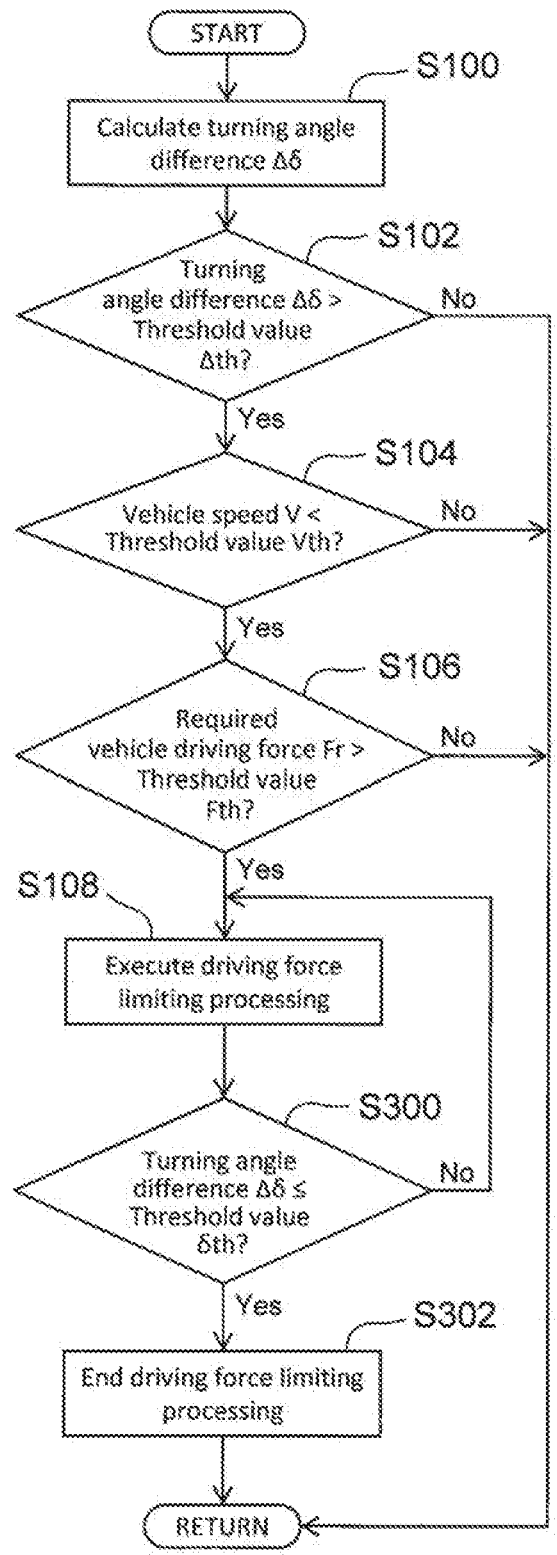
FIG. 7 is a flowchart showing a routine of processing concerning control of the vehicle running control system according to a second modification example of the first embodiment of the present disclosure.

The driving force limiting processing according to the present disclosure may be executed according to one of the following routines shown in FIGS. 6 and 7, for example, instead of the routine shown in FIG. 4.

FIG. 6 is a flowchart that shows a routine of processing concerning the control of the vehicle running control system 10 according to a first modification example of the first embodiment of the present disclosure.

In the routine shown in FIG. 6, unlike the routine shown in FIG. 4, the determination condition (step S106) concerning the vehicle driving force F is omitted. If the determination result of step S104 is positive (V<Vth), the processing proceeds to step S200, and the driving force limiting processing is executed.

To be more specific, in the driving force limiting processing in step S200, the control device 50 may limit the target vehicle driving force Ft such that, for example, the target vehicle driving force Ft does not exceed a predetermined value (e.g., a constant value). In addition, the target vehicle driving force Ft may also be limited to become smaller than the required vehicle driving force Fr by, for example, a predetermined reduction correction amount (e.g., a constant value).

As in the routine shown in FIG. 6 described above, the driving force limiting processing according to the present disclosure may be executed when the turning angle difference Δδ is greater than the turning angle threshold value δth in the low vehicle speed condition without judging whether or not the required vehicle driving force Fr is greater than the driving force threshold value Fth.

FIG. 7 is a flowchart that shows a routine of processing concerning the control of the vehicle running control system 10 according to a second modification example of the first embodiment of the present disclosure.

The routine shown in FIG. 7 is different from the routine shown in FIG. 4 in that the processing of steps S300 and S302 are added. According to the routine shown in FIG. 7, after the driving force limiting processing is executed in step S108, the processing proceeds to step S300.

In step S300, the control device 50 determines whether or not the turning angle difference Δδ is equal to or less than the turning angle threshold value δth. If, as a result, the determination result is negative, that is, if the turning angle difference Δδ has not yet decreased to the turning angle threshold value δth or less, the processing of step S108 is repeatedly executed.

If, on the other hand, the determination result of step S300 is positive, that is, if the turning angle difference Δδ has been reduced to the turning angle threshold value δth or less, the processing proceeds to step S302. In step S302, the control device 50 terminates the driving force limiting processing.

The routine shown in FIG. 7 makes it possible to prevent the driving force limiting processing from being terminated due to the fact that the vehicle speed V has reached the threshold value Vth although the turning angle difference Δδ is not reduced to the turning angle threshold value δth or less during the execution of the driving force limiting processing. Therefore, as compared to the routine shown in FIG. 4, the driving force limiting processing can be executed more reliably until the turning angle difference Δδ becomes equal to or less than the turning angle threshold value δth.

It should be noted that the processing of steps S300 and S302 may also be added after the processing of step S200 of the routines shown in FIG. 6. Furthermore, instead of using the determination of step S300, the control device 50 may execute the driving force limiting processing until the turning angle difference Δδ is eliminated (i.e., until the difference Δδ is made zero).

2. Second Embodiment

Next, a vehicle running control system according to a second embodiment of the present disclosure will be described with reference to FIGS. 8 and 9. This vehicle running control system is the same as the vehicle running control system 10 according to the first embodiment described above, except for the points described below.

2-1. Outline of Driving Force Limiting Processing

Figure 8:
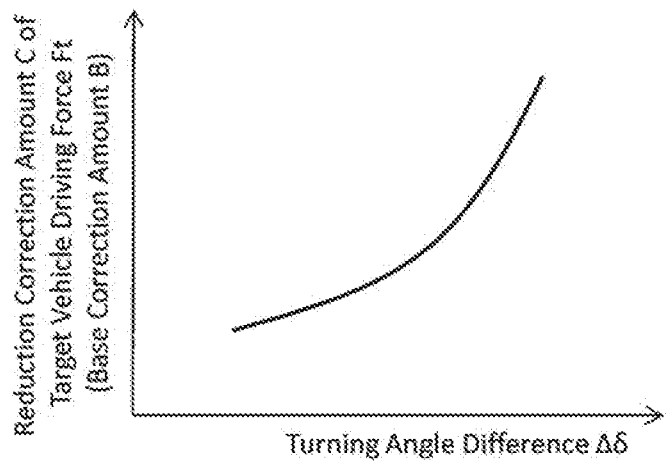
FIG. 8 is a graph showing an example of setting of a reduction correction amount C of a target vehicle driving force Ft based on a turning angle difference $\Delta\delta$.

FIG. 8 is a graph that shows an example of setting of a reduction correction amount C of the target vehicle driving force Ft based on the turning angle difference $\Delta\delta$. According to the driving force limiting processing of the first embodiment described above, the target vehicle driving force Ft is corrected (limited) so as to have a value (constant value) equal to the driving force threshold value Fth. On the other hand, in a driving force limit processing of the present embodiment, the correction (i.e., limiting) of the target vehicle driving force Ft is performed using the reduction correction amount (i.e., limit amount) C of the target vehicle driving force Ft with respect to the required vehicle driving force Fr.

Specifically, a relationship between the required vehicle driving force Fr and the reduction correction amount C, and a target vehicle driving force Ft' after the correction (limitation) is expressed by the following equation (1).

$$Ft'=Fr-C \qquad (1)$$

Moreover, the reduction correction amount C includes a basic correction amount B. In the present embodiment, the reduction correction amount C is equal to the basic correction amount B. This basic correction amount B is changed in accordance with the magnitude of the turning angle difference $\Delta\delta$. In more detail, as shown in FIG. 8, the reduction correction amount C (basic correction amount B) of the target vehicle driving force Ft is set so as to become greater when the turning angle difference $\Delta\delta$ is greater. However, the relationship between the reduction correction amount C (basic correction amount B) and the turning angle difference $\Delta\delta$ is not limited to the curve shown in FIG. 8 as long as the reduction correction amount C becomes greater when the turning angle difference $\Delta\delta$ is greater, and may be represented by a curve having another desired curvature or a straight line, for example.

The driving force limiting processing of the present embodiment described above can be executed, for example, as follows. That is to say, the control device 50 may store, as a map, the relationship between the turning angle difference $\Delta\delta$ and the reduction correction amount C (the basic correction amount B) as shown in FIG. 8. Then, for example, in step S108 of the routine shown in FIG. 4, the control device 50 may obtain the reduction correction amount C depending on the turning angle difference $\Delta\delta$ from this map, and calculate the target vehicle driving force Ft' limited by the reduction correction amount C according to the relation of equation (1).

2-2. Effects

Figure 9:
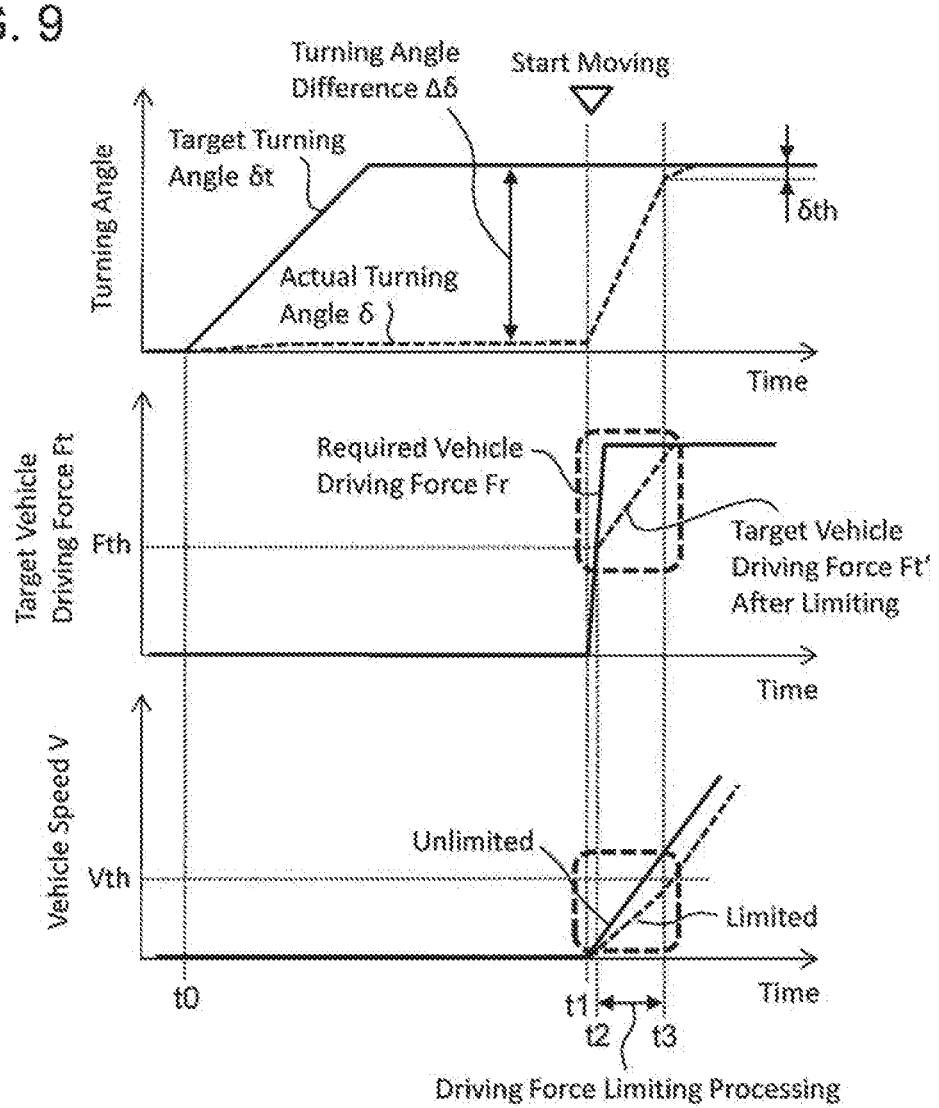
FIG. 9 is a time chart showing an example of the operation of the vehicle with a driving force limiting processing according to a second embodiment of the present disclosure.

FIG. 9 is a time chart that shows an example of the operation of the vehicle with the driving force limiting processing according to the second embodiment of the present disclosure. The reduction correction amount C (basic correction amount B) becomes smaller when the turning angle difference $\Delta\delta$ becomes smaller during the execution of the driving force limiting processing. Thus, as shown in FIG. 9, the limit of the target vehicle driving force Ft is gradually relaxed in association with a decrease in the turning angle difference $\Delta\delta$.

When compared with the same yaw rate gain [deg/s/deg], a generated yaw rate [deg/s] is smaller when the remaining turning angle difference $\Delta\delta$ [deg] is smaller than when the difference $\Delta\delta$ is greater. That is to say, if the remaining turning angle difference $\Delta\delta$ is small, it can be said that even if the limitation of the target vehicle driving force Ft is relaxed, the occurrence of a large yaw rate can be reduced as compared to when the turning angle difference $\Delta\delta$ is great.

As described so far, according to the driving force limiting processing of the present embodiment, the reduction correction amount C of the target vehicle driving force Ft is determined in accordance with the magnitude of the turning angle difference $\Delta\delta$. This makes it possible to more appropriately set the reduction correction amount C required for reducing the occurrence of a large yaw rate under the remaining turning angle difference $\Delta\delta$, as compared with an example in which the reduction correction amount C is set to a constant value. In addition, according to this kind of manner, the limitation of degree of the vehicle speed increase due to the limitation of the target vehicle driving force Ft can be reduced to the minimum necessary in accordance with the turning angle difference $\Delta\delta$. Furthermore, as compared with the example in which the reduction correction amount C is set to a constant value, a step difference of the target vehicle driving force Ft can be reduced at the end of the limitation of the target vehicle driving force Ft.

3. Third Embodiment

Next, a vehicle running control system according to a third embodiment of the present disclosure will be described with reference to FIG. 10. This vehicle running control system is the same as the vehicle running control system according to the second embodiment described above, except for the points described below.

3-1. Outline of Driving Force Limiting Processing

In a driving force limiting processing according to the present embodiment, the control device 50 uses a reduction correction amount C' to limit the target vehicle driving force Ft. The reduction correction amount C' is obtained by multiplying the basic correction amount B described in the second embodiment by a first gain coefficient G1 depending on the vehicle speed V, as represented by the following equation (2). Also, the first gain coefficient G1 is set to become greater when the vehicle speed V is high than when the vehicle speed V is low.

$$C'=B \times G1 \qquad (2)$$

Figure 10:
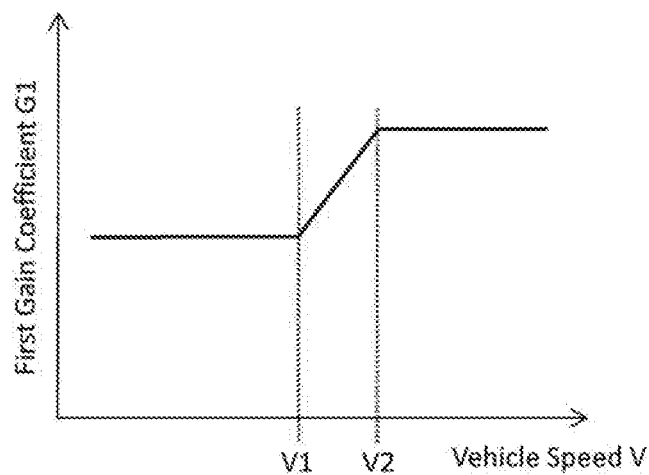
FIG. 10 is a graph showing an example of setting of a first gain coefficient G1 used in a driving force limiting processing according to a third embodiment of the present disclosure.

To be more specific, FIG. 10 is a graph that shows an example of setting of the first gain coefficient G1 used in the driving force limiting processing according to the third embodiment of the present disclosure. In the example shown in FIG. 10, the first gain coefficient G1 is set to be constant in a range less than or equal to a first vehicle speed value V1. Also, in a range exceeding the first vehicle speed value V1, the first gain coefficient G1 is set to become greater when the vehicle speed V is higher. Furthermore, in a range exceeding a second vehicle speed value V2 which is greater than the first vehicle speed value V1, the first gain coefficient G1 is set to become constant.

However, the relationship between the first gain coefficient G1 and the vehicle speed V is not limited to the setting shown in FIG. 10 as long as the first gain coefficient G1 is set to be greater when the vehicle speed V is high than when the vehicle speed V is low, and may be determined by using another setting manner, such as a curve of a desired curvature or a straight line of a desired slope.

3-2. Effects

Even if the turning angle difference Δδ left during the execution of the driving force limiting processing is the same, the yaw rate gain becomes greater when the vehicle speed V is higher. As a result, a large change in yaw rate becomes likely to occur. In this regard, the manner of limiting the target vehicle driving force Ft in the second embodiment described above can be regarded as using a constant first gain coefficient G1.

On the other hand, according to the reduction correction amount C' used for the limitation of the target vehicle driving force Ft in the present embodiment, the basic correction amount B based on the turning angle difference Δδ is used in the same manner as in the second embodiment, and the basic correction amount B is corrected from the viewpoint of the vehicle speed V. More specifically, by using the first gain coefficient G1, the reduction correction amount C' is corrected so as to become greater when the vehicle speed V is high than when the vehicle speed V is low, with the basic correction amount B taken as the reference. This makes it possible to more appropriately limit the target vehicle driving force Ft in consideration of not only the turning angle difference Δδ but also the vehicle speed V.

4. Fourth Embodiment

Next, a vehicle running control system according to a fourth embodiment of the present disclosure will be described with reference to FIG. 11. This vehicle running control system is the same as the vehicle running control system according to the second embodiment described above, except for the points described below.

4-1. Outline of Driving Force Limiting Processing

In a driving force limiting processing according to the present embodiment, the control device 50 uses a reduction correction amount C" to limit the target vehicle driving force Ft. The reduction correction amount C" is obtained by multiplying the basic correction amount B described in the second embodiment by a second gain coefficient G2 depending on the turning speed dδ/dt, which is the change speed of the actual turning angle δ, as represented by the following equation (3). The second gain coefficient G2 is set to be greater when the turning speed dδ/dt, which is the change rate of the actual turning angle δ, is higher than when the turning speed dδ/dt is lower.

$$C''=B\times G2 \quad (3)$$

Figure 11:
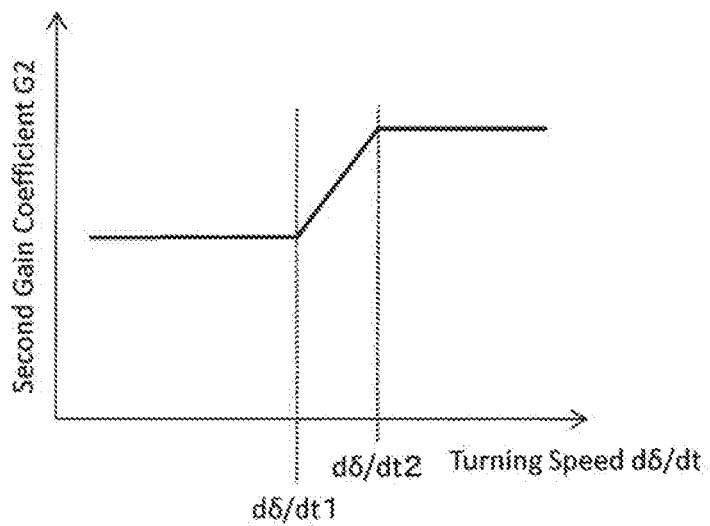
FIG. 11 is a graph showing an example of setting of a second gain coefficient G2 used in a driving force limiting processing according to a fourth embodiment of the present disclosure.

To be more specific, FIG. 11 is a graph that shows an example of setting of the second gain coefficient G2 used in the driving force limiting processing according to the fourth embodiment of the present disclosure. In the example shown in FIG. 11, the second gain factor G2 is set to be constant in a range less than or equal to a first turning speed value dδ/dt1. Also, in a range exceeding the first turning speed value dδ/dt1, the second gain coefficient G2 is set to become greater when the turning speed dδ/dt is higher. Furthermore, in a range exceeding a second turning speed value dδ/dt2 which is greater than the first turning speed value dδ/dt1, the second gain coefficient G2 is set to become constant.

However, similarly to the first gain coefficient G1 described above, the relationship between the second gain coefficient G2 and the turning speed dδ/dt is not limited to the setting shown in FIG. 11 as long as the second gain coefficient G2 is set to be greater when the turning speed dδ/dt is high than when the turning speed dδ/dt is low, and may be determined by using another setting method, such as a curve of a desired curvature or a straight line of a desired slope.

4-2. Effects

Even if the turning angle difference ΔA left during the execution of the driving force limiting processing is the same, when the turning speed dδ/dt is higher, a large change in the yaw rate becomes likely to occur. In this regard, the manner of limiting the target vehicle driving force Ft in the second embodiment described above can be regarded as using a constant second gain coefficient G2.

On the other hand, according to the reduction correction amount C" used for the limitation of the target vehicle driving force Ft in the present embodiment, the basic correction amount B based on the turning angle difference Δδ is used in the same manner as in the second embodiment, and the basic correction amount B is corrected from the viewpoint of the turning speed dδ/dt. More specifically, by using the second gain coefficient G2, the reduction correction amount C" is corrected so as to be greater when the turning speed dδ/dt is high than when the turning speed dδ/dt is low, with the basic correction amount B taken as the reference. This makes it possible to more appropriately limit the target vehicle driving force Ft in consideration of not only the turning angle difference Δδ but also the turning speed dδ/dt.

Furthermore, the limitation of the target vehicle driving force Ft by the use of the second gain coefficient G2 described above may be implemented in combination with the limitation of the target vehicle driving force Ft by the use of the first gain coefficient G1 according to the third embodiment. That is to say, a reduction correction amount obtained by multiplying the basic correction amount B by both the first gain coefficient G1 and the second gain coefficient G2 may be used to limit the target vehicle driving force Ft.

The embodiments and modification examples described above may be combined in other ways than those explicitly described above as required and may be modified in various ways without departing from the scope of the present disclosure.

What is claimed is:

1. A vehicle running control system, comprising:
   a steering apparatus that includes a turning device turning a wheel of a vehicle and being mechanically separated from a steering wheel;
   a vehicle drive unit configured to generate a vehicle driving force; and
   an electronic control unit (ECU) including a processor and a memory that stores a program which is executed by the processor, the ECU being programmed to:
   control the turning device such that an actual turning angle of the wheel approaches a target turning angle;
   determine a target vehicle driving force according to a required vehicle driving force based on a vehicle driving request;
   determine a turning angle difference of the actual turning angle with respect to the target turning angle;
   determine whether the turning angle difference is greater than a turning angle threshold value;

based upon a determination that the turning angle difference is greater than the turning angle threshold value, determine whether a vehicle speed of the vehicle is lower than a vehicle speed threshold value;

based upon a determination that the vehicle speed is lower than the vehicle speed threshold value, determine that the vehicle is in a low vehicle speed condition;

based upon a determination that the vehicle speed is equal to or higher than the vehicle speed threshold value, determine that the vehicle is not in the low vehicle speed condition;

limit the target vehicle driving force to be smaller than the required vehicle driving force based upon the determination that: (i) the turning angle difference is greater than the turning angle threshold value and (ii) the vehicle is in the low vehicle speed condition; and not limit the target vehicle driving force to be smaller than the required vehicle driving force based upon the determination that the turning angle difference is not greater than the turning angle threshold value wherein the ECU is programmed to calculate, as the target vehicle driving force, a value obtained by subtracting a reduction correction amount from the required vehicle driving force, and wherein the reduction correction amount includes a base correction amount being greater when the turning angle difference is greater wherein the reduction correction amount is obtained by multiplying the base correction amount by a first gain coefficient according to the vehicle speed, and wherein the first gain coefficient is greater when the vehicle speed is high than when the vehicle speed is low.

2. The vehicle running control system according to claim 1, wherein the reduction correction amount is obtained by multiplying the base correction amount by a second gain coefficient according to a turning speed being a change rate of the actual vehicle turning angle, and wherein the second gain coefficient is greater when the turning speed is high than when the turning speed is low.

3. The vehicle running control system according to claim 1, wherein the ECU is programmed to limit the target vehicle driving force to be smaller than the required vehicle driving force based upon the determination that: the vehicle is in the low vehicle speed condition, the turning angle difference is greater than the turning angle threshold value, and the required vehicle driving force is higher than a driving force threshold value.

\* \* \* \* \*